US012713312B2

(12) United States Patent
Hong

(10) Patent No.: US 12,713,312 B2
(45) Date of Patent: Aug. 18, 2026

(54) CELL HANDOVER METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 296 days.

(21) Appl. No.: 18/281,759

(22) PCT Filed: Mar. 12, 2021

(86) PCT No.: PCT/CN2021/080433
§ 371 (c)(1),
(2) Date: Sep. 12, 2023

(87) PCT Pub. No.: WO2022/188142
PCT Pub. Date: Sep. 15, 2022

(65) Prior Publication Data
US 2024/0172064 A1 May 23, 2024

(51) Int. Cl.
*H04W 36/00* (2009.01)
*H04W 8/22* (2009.01)

(52) U.S. Cl.
CPC ..... *H04W 36/008355* (2023.05); *H04W 8/22* (2013.01); *H04W 36/0016* (2013.01); *H04W 36/0079* (2018.08)

(58) Field of Classification Search
CPC ............... H04W 8/22; H04W 36/0016; H04W 36/008355; H04W 36/0079
See application file for complete search history.

(56) References Cited

U.S. PATENT DOCUMENTS 10,708,824 B2 7/2020 Lee et al.
10,911,990 B2 2/2021 Ying et al.
(Continued)

FOREIGN PATENT DOCUMENTS

CN 108605259 A 9/2018
CN 110495208 A 11/2019
(Continued)

OTHER PUBLICATIONS

International Search Report of PCT/CN2021/080433 dated Nov. 22, 2021 with English translation, (4p).

*Primary Examiner* — Melanie Jagannathan
(74) *Attorney, Agent, or Firm* — Arch & Lake LLP; Hao Tan; Shen Wang

(57) ABSTRACT

A cell handover method is provided. The method is performed by a source base station. The method includes determining that a multi-card terminal needs to perform a cell handover; sending a handover request signaling and target terminal capability information of the multi-card terminal to a core network device, where the target terminal capability information is configured to indicate at least one of following capabilities: a multi-card capability supported by the multi-card terminal, or a capability of the multi-card terminal to support reporting a multi-card problem; and determining, based on a handover command returned by the core network device, that a target base station accepts a cell handover request corresponding to the multi-card terminal based on the target terminal capability information; and controlling the multi-card terminal to perform the cell handover.

14 Claims, 9 Drawing Sheets sending a handover request signaling and target terminal capability information of a multi-card terminal to a core network device, in response to determining that the multi-card terminal needs to perform a cell handover — 101

↓ controlling the multi-card terminal to perform the cell handover, after it is determined, based on a handover command returned by the core network device, that a target base station accepts a cell handover request corresponding to the multi-card terminal based on the target terminal capability information — 102

(56) References Cited

U.S. PATENT DOCUMENTS

| | | | | |
|---|---|---|---|---|
| 2014/0274006 | A1* | 9/2014 | Mutya | H04W 4/16 455/416 |
| 2016/0057683 | A1 | 2/2016 | Yang et al. | |
| 2017/0325144 | A1* | 11/2017 | Raghunathan | H04W 48/06 |
| 2018/0324646 | A1 | 11/2018 | Lee et al. | |
| 2019/0335365 | A1 | 10/2019 | Ying et al. | |
| 2020/0045604 | A1 | 2/2020 | Allan et al. | |
| 2021/0385705 | A1* | 12/2021 | Liu | H04W 36/0072 |
| 2022/0141723 | A1* | 5/2022 | Patankar | H04W 24/02 455/436 |
| 2022/0225190 | A1* | 7/2022 | Gummadi | H04W 76/28 |
| 2022/0264506 | A1* | 8/2022 | Kiss | H04W 60/00 |
| 2023/0070472 | A1* | 3/2023 | Li | H04W 8/183 |
| 2023/0232291 | A1* | 7/2023 | Ramachandra | H04W 36/0079 455/436 |
| 2023/0254918 | A1* | 8/2023 | Gurumoorthy | H04W 8/24 455/435.1 |
| 2024/0107409 | A1* | 3/2024 | Da Silva | H04W 36/0033 |
| 2024/0244420 | A1* | 7/2024 | Zhuang | H04W 8/24 |
| 2024/0244496 | A1* | 7/2024 | Krishne Gowda | H04W 36/0055 |

FOREIGN PATENT DOCUMENTS

| | | | |
|---|---|---|---|
| CN | 110612742 | A | 12/2019 |
| WO | 2021007696 | A | 1/2021 |

* cited by examiner

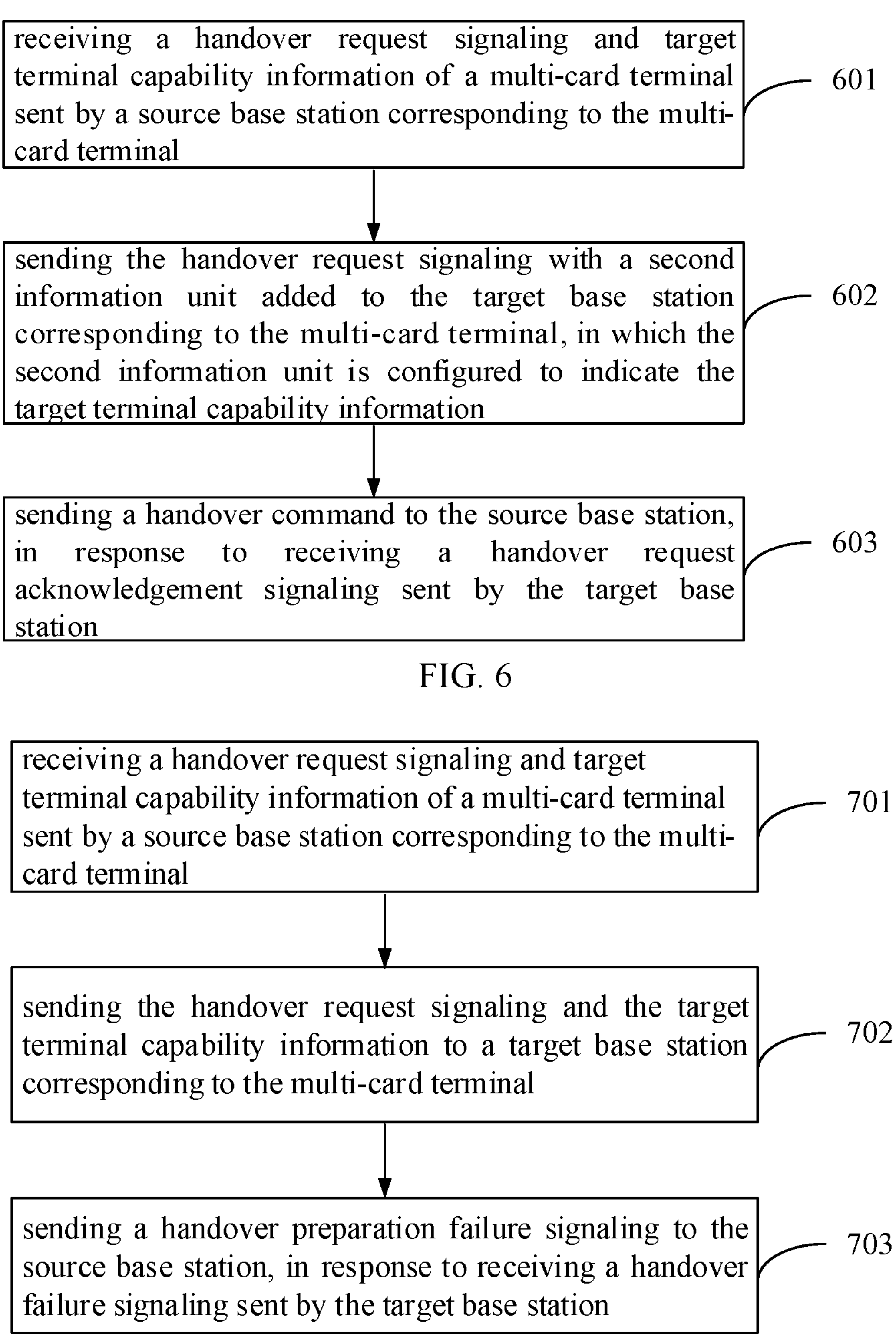
receiving a handover request signaling and target terminal capability information of a multi-card terminal sent by a source base station corresponding to the multi-card terminal
601
sending the handover request signaling with a second information unit added to the target base station corresponding to the multi-card terminal, in which the second information unit is configured to indicate the target terminal capability information
602
sending a handover command to the source base station, in response to receiving a handover request acknowledgement signaling sent by the target base station
603
FIG. 6
receiving a handover request signaling and target terminal capability information of a multi-card terminal sent by a source base station corresponding to the multi-card terminal
701
sending the handover request signaling and the target terminal capability information to a target base station corresponding to the multi-card terminal
702
sending a handover preparation failure signaling to the source base station, in response to receiving a handover failure signaling sent by the target base station
703
FIG. 7 receiving a handover request signaling and target terminal capability information of a multi-card terminal sent by a core network device

901 sending a handover failure signaling to the core network device, after determining to reject the cell handover request corresponding to the multi-card terminal based on the target terminal capability information

902

CELL HANDOVER METHOD

CROSS-REFERENCE TO RELATED APPLICATION

This application is the U.S. national phase application of International Patent Application No. PCT/CN2021/080433, filed on Mar. 12, 2021, the entire contents of which are incorporated herein by reference for all purposes.

FIELD

The present disclosure relates to the field of communications, and especially to a cell handover method, a cell handover apparatus, and a storage medium.

BACKGROUND

With the development of wireless communication technology, there are more and more multi-card terminals.

At present, processing methods for multi-card terminals are mainly based on the implementation of various terminal manufacturers, and there is no unified standard for regulations, which leads to many different terminal behaviors and processing methods, such as dual-card single-standby, dual-card dual-standby single-pass, dual-card dual-standby dual-pass, and so on. Furthermore, different terminal behaviors and processing methods may lead to multi-card problems in multi-card terminals.

SUMMARY

According to a first aspect of an embodiment of the present disclosure, there is provided a cell handover method. The method is performed by a source base station and includes determining that a multi-card terminal needs to perform a cell handover, sending a handover request signaling and target terminal capability information of the multi-card terminal to a core network device, in which the target terminal capability information is configured to indicate at least one of a multi-card capability supported by the multi-card terminal, or a capability of the multi-card terminal to support reporting a multi-card problem, and determining, based on a handover command returned by the core network device, that a target base station accepts a cell handover request corresponding to the multi-card terminal based on the target terminal capability information, controlling the multi-card terminal to perform the cell handover.

According to a second aspect of an embodiment of the present disclosure, there is provided a cell handover method. The method is performed by a core network device and includes receiving a handover request signaling and target terminal capability information of a multi-card terminal sent by a source base station corresponding to the multi-card terminal, in which the target terminal capability information is configured to indicate at least one of a multi-card capability supported by the multi-card terminal, or a capability of the multi-card terminal to support reporting a multi-card problem, sending the handover request signaling and the target terminal capability information to a target base station corresponding to the multi-card terminal, and receiving a handover request acknowledgement signaling sent by the target base station, sending a handover command to the source base station, in which the handover request acknowledgement signaling is configured to indicate that the target base station accepts a cell handover request corresponding to the multi-card terminal based on the target terminal capability information.

According to a third aspect of an embodiment of the present disclosure, there is provided a cell handover method. The method is performed by a target base station and includes receiving a handover request signaling and target terminal capability information of a multi-card terminal sent by a core network device, in which the target terminal capability information is configured to indicate at least one of a multi-card capability supported by the multi-card terminal, or a capability of the multi-card terminal to support reporting a multi-card problem, and determining to accept a cell handover request corresponding to the multi-card terminal based on the target terminal capability information, sending a handover request acknowledgement signaling to the core network device.

It is to be understood that the foregoing general description and the following detailed description are illustrative and explanatory merely and are not restrictive of the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

FIG. 6 is a flow chart showing another cell handover method according to an illustrative embodiment.

FIG. 7 is a flow chart showing another cell handover method according to an illustrative embodiment.

DETAILED DESCRIPTION

Figure 1:
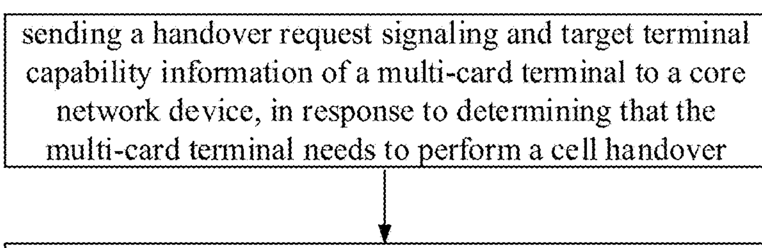
FIG. 1 is a flow chart showing a cell handover method according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the disclosure as recited in the appended claims.

Terms used herein in the present disclosure are only for the purpose of describing specific embodiments, but should not be construed to limit the present disclosure. As used in the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It is to be understood that, although terms such as "first," "second" and "third" may be used in the present disclosure for describing various information, this information should not be limited by these terms. These terms are only used for distinguishing information of the same type from each other. For example, first information may also be referred to as second information, and similarly, the second information may also be referred to as the first information, without departing from the scope of the present disclosure. As used herein, the term "if" may be construed to mean "when" or "upon" or "in response to determining" depending on the context.

In an embodiment of the present disclosure, a multi-card terminal may have, but is not limited to, the following multi-card problems.

Problem 1: In a process where the multi-card terminal communicates with a first system via one of SIM cards, the multi-card terminal needs to keep detecting a second system regularly, including, but not limited to, monitoring paging messages, performing system measurements, reading system messages, and the like. This may affect communication performance of the first system.

Problem 2: a paging occasion is calculated according to a terminal identifier, and the multi-card terminal has multiple SIM cards, so corresponding paging occasions between different SIM cards may be the same, thus resulting in systematic paging collisions.

Problem 3: In a process where the multi-card terminal communicates with a first system via one of SIM cards, the other SIM card monitors a paging message from a second system, and the multi-card terminal needs to decide whether to perform a paging response on the paging. At present, whether to perform the paging response is performed based on a rule configured by a user.

Problem 4: When the multi-card terminal determines to respond to the paging message of the second system, a service being currently performed in the first system needs to be stopped. In the absence of a suspension mechanism for the current service, the multi-card terminal automatically disconnects a radio resource control (RRC) connection of the first system and leaves the first system. After the multi-card terminal leaves the first system, the first system continues to page the multi-card terminal, thus resulting in waste of paging resources.

Problem 5: When the terminal reads a paging or a system measurement in the second system, a short interval in the first system will be generated, and a duration is generally about 20 ms (milliseconds), but for the first system, it is equivalent to experiencing shadow fading (in a mobile communication, due to a shadowing effect caused by obstacles, a received signal strength decreases, but a median field strength varies slowly with geographical changes, also referred to as slow fading). Since a short interval occurs once in each paging cycle, a power control and a link adaptation algorithm of a network may be affected, thus resulting in waste of resources in the first system.

Problem 6: When determining a cell to switch to the second system, the terminal needs to read system information in the second system, thus causing a long interval in the first system, and a duration is generally about 1 second. The first system may consider the long interval as an error situation. In the related art, neither a base station nor the terminal can handle this situation.

Problem 7: In a process of tracking area update (TAU) in the second system, the terminal may cause a longer interval in the first system. A duration may be up to seconds, thus having a greater impact on the first system.

In order to reduce the above-mentioned multi-card problems existing in the multi-card terminal, and more specifically solve the multi-card problems for multi-card terminal, the present disclosure provides the following cell handover solutions.

A cell handover method provided in the present disclosure will be first introduced below from a source base station side.

An embodiment of the present disclosure provides a cell handover method. Referring to FIG. 1, FIG. 1 is a flow chart showing a cell handover method according to an embodiment. The method may be performed by a source base station. The base station is a base station to which a multi-card terminal is currently connected, or a base station to which a multi-card terminal currently resides. The method may include steps as follows.

In step 101, a handover request signaling and target terminal capability information of a multi-card terminal are sent to a core network device, in response to determining that the multi-card terminal needs to perform a cell handover.

In an embodiment of the present disclosure, the core network device includes, but is not limited to, an access and mobility management function (AMF) device. In case that it is determined that the multi-card terminal needs to perform the cell handover, the source base station may send the handover request signaling and the target terminal capability information of the multi-card terminal to the core network device. The target terminal capability information is configured to indicate at least one of a multi-card capability supported by the multi-card terminal, or a capability of the multi-card terminal to support reporting a multi-card problem.

In an alternative example, the multi-card capability supported by the multi-card terminal includes, but is not limited to, the number of SIM cards included in the multi-card terminal, a state of each SIM card (whether it is in an active state), operator information corresponding to each SIM card, and so on.

In another alternative example, the capability of the multi-card terminal to support reporting the multi-card problem means that the multi-card terminal has the capability of determining a multi-card problem existing in the multi-card terminal itself and reporting a determined multi-card problem to a network side. The multi-card problem includes, but is not limited to, at least one of the above-mentioned seven multi-card problems involved in the present disclosure.

In a possible implementation, the multi-card terminal may report the above-mentioned target terminal capability information to the source base station in a cell access process of accessing a cell corresponding to the source base station, and after storing it, the source base station sends the handover request signaling and the target terminal capability information to the core network device when it is determined that the multi-card terminal needs to perform the cell handover.

In step 102, the multi-card terminal is controlled to perform the cell handover, after it is determined, based on a handover command returned by the core network device, that a target base station accepts a cell handover request corresponding to the multi-card terminal based on the target terminal capability information.

In an embodiment of the present disclosure, after receiving the handover command returned by the core network device, the source base station may determine that the target base station accepts the cell handover request corresponding to the multi-card terminal based on the target terminal capability information. At this time, the source base station may control the multi-card terminal to perform the cell handover, thus handing over to a cell corresponding to the target base station.

In the above-mentioned embodiment, in case that it is determined that the multi-card terminal needs to perform the cell handover, the source base station may send the handover request signaling and the target terminal capability information of the multi-card terminal to the core network device, and then send the target terminal capability information to the target base station via the core network device. The target base station may determine to accept the cell handover request corresponding to the multi-card terminal based on the target terminal capability information. After the multi-card terminal accesses the cell corresponding to the target base station, the target base station may more specifically solve the multi-card problem for the multi-card terminal, which is high in availability.

Figure 2:
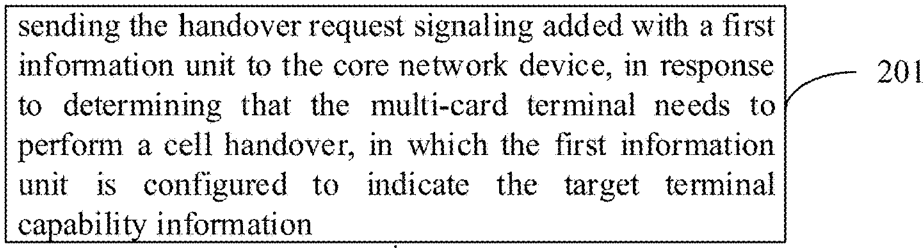
FIG. 2 is a flow chart showing another cell handover method according to an illustrative embodiment.

In some alternative embodiments, referring to FIG. 2, FIG. 2 is a flow chart showing a cell handover method according to an embodiment. The method may be performed by a source base station, and may include steps as follows.

In step 201, the handover request signaling added with a first information unit is sent to the core network device, in response to determining that the multi-card terminal needs to perform the cell handover, in which the first information unit is configured to indicate the target terminal capability information.

In an embodiment of the present disclosure, the core network device includes, but is not limited to, an AMF device. The target terminal capability information is configured to indicate at least one of a multi-card capability supported by the multi-card terminal, or a capability of the multi-card terminal to support reporting a multi-card problem. The source base station may add a new information unit into the handover request signaling, that is, add the first information unit. The first information unit is configured to indicate the target terminal capability information.

In step 202, the multi-card terminal is controlled to perform the cell handover, after it is determined, based on a handover command returned by the core network device, that a target base station accepts a cell handover request corresponding to the multi-card terminal based on the target terminal capability information.

In the above-mentioned embodiment, the source base station may directly add the first information unit into the handover request signaling, and indicate the target terminal capability information of the multi-card terminal via the first information unit, so that the handover request signaling and the target terminal capability information are sent to the core network device together, and there is no need to send the target terminal capability information via a separate signaling, which saves signaling resources and is high in availability.

Figure 3:
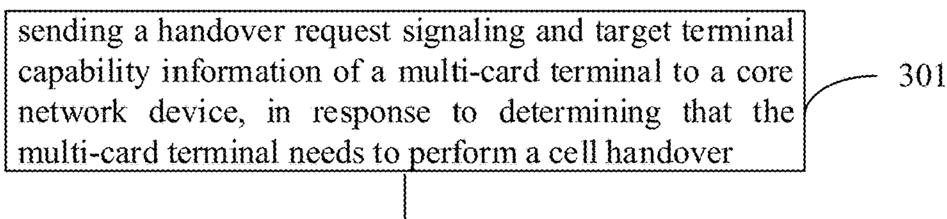
FIG. 3 is a flow chart showing another cell handover method according to an illustrative embodiment.

In some alternative embodiments, referring to FIG. 3, FIG. 3 is a flow chart showing a cell handover method according to an embodiment. The method may be performed by a source base station, and may include steps as follows.

In step 301, a handover request signaling and target terminal capability information of a multi-card terminal are sent to a core network device, in response to determining that the multi-card terminal needs to perform a cell handover.

In step 302, it is determined, based on a handover preparation failure signaling returned by the core network device, that the target base station rejects the cell handover request corresponding to the multi-card terminal based on the target terminal capability information.

In an embodiment of the present disclosure, in case that the source base station receives the handover preparation failure signaling returned by the core network device, the source base station may determine that the target base station rejects the cell handover request corresponding to the multi-card terminal based on the target terminal capability information. A reason for the target base station to reject to accept the cell handover request includes, but is not limited to, any one of the fact that the target base station does not have the capability to solve the multi-card problem existing in the multi-card terminal, or that although the target base station has the capability to solve the multi-card problem existing in the multi-card terminal, the multi-card problem which may be solved by the target base station does not match the multi-card problem currently reported by the multi-card terminal.

In the above-mentioned embodiment, the source base station may determine, based on the handover preparation failure signaling returned by the core network device, that the target base station rejects the cell handover request corresponding to the multi-card terminal based on the target terminal capability information. Even if the multi-card terminal accesses the target base station, there will be performance problems. The source base station may control the multi-card terminal to hand over to a cell corresponding to other base stations by interacting with the multi-card terminal, so that other base stations may more specifically solve the multi-card problem for the multi-card terminal, which is high in availability.

Figures 4, 5:
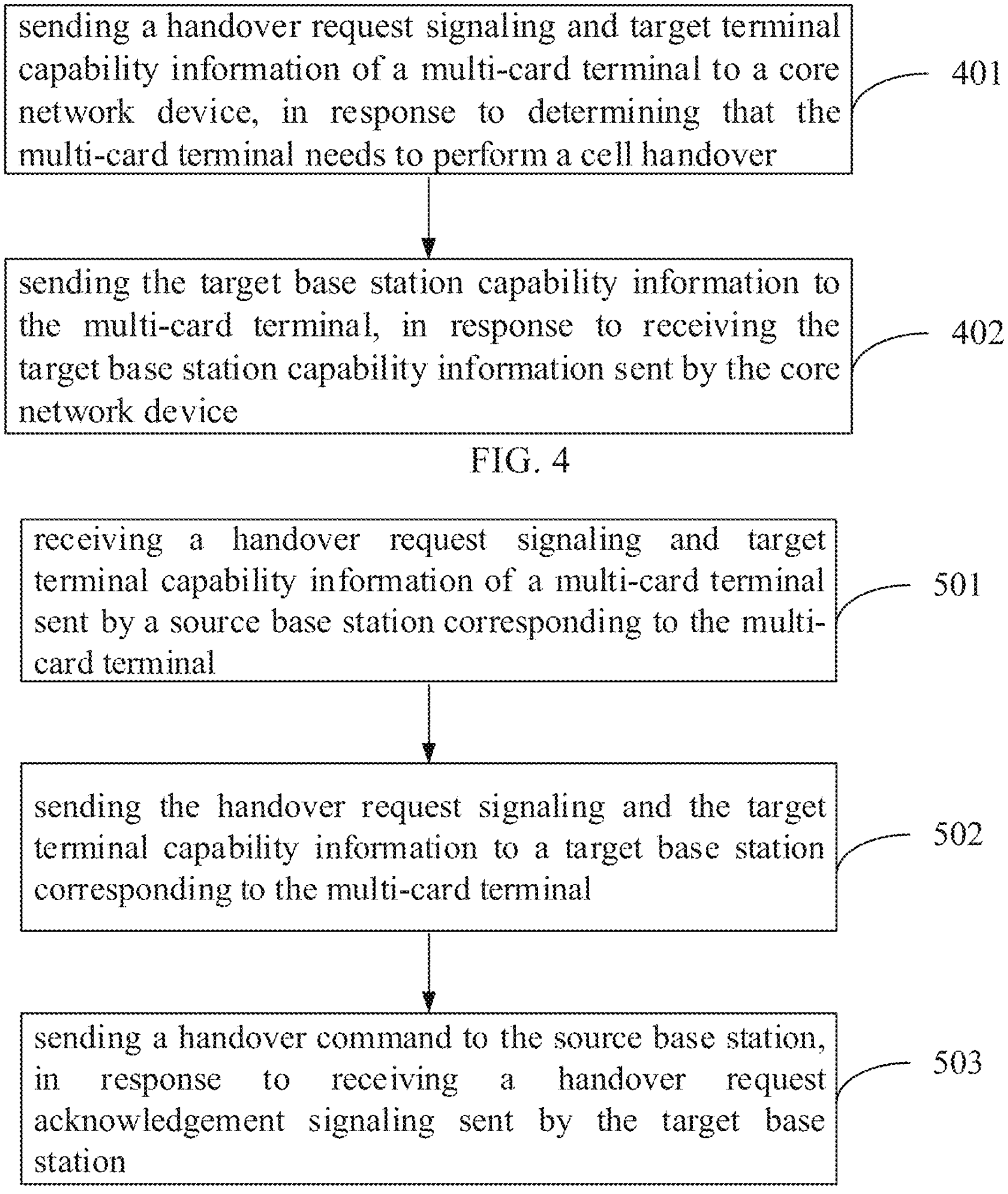
FIG. 4 is a flow chart showing another cell handover method according to an illustrative embodiment.
FIG. 5 is a flow chart showing another cell handover method according to an illustrative embodiment.

In some alternative embodiments, referring to FIG. 4, FIG. 4 is a flow chart showing a cell handover method according to an embodiment. The method may be performed by a source base station, and may include steps as follows.

In step 401, a handover request signaling and target terminal capability information of a multi-card terminal are sent to a core network device, in response to determining that the multi-card terminal needs to perform a cell handover.

In step 402, the target base station capability information is sent to the multi-card terminal, in response to receiving the target base station capability information sent by the core network device.

In an embodiment of the present disclosure, the target base station capability information is configured to indicate a capability supported by the target base station to solve the multi-card problem existing in the multi-card terminal. The target base station is a serving base station to which the multi-card terminal is to be handed over.

In an example, the target base station capability information may be configured to indicate that the target base station may support solving at least one of the above-mentioned seven multi-card problems. The multi-card problems that the target base station may support to solve may be respectively indicated by, but not limited to, using bit values corresponding to seven bits. For example, in case that a value of the 7 bits corresponding to the target base station capability information is 1100100, the source base station may determine that the target base station supports solving problems 1, 2 and 5 in the above-mentioned multi-card problems.

The above is only an illustrative explanation, and other manners may also be used to indicate the target base station capability information in practical applications, which is not limited in the present disclosure.

In a possible implementation, after it is determined that the target base station accepts the cell handover request corresponding to the multi-card terminal based on the target terminal capability information, the source base station receives the handover command returned by the core network device. The handover command includes the target base station capability information. The source base station may send the target base station capability information to the multi-card terminal, so that the multi-card terminal may more specifically solve the multi-card problem existing in the multi-card terminal via the target base station after handing over to the cell corresponding to the target base station.

In another possible implementation, after it is determined that the target base station accepts the cell handover request corresponding to the multi-card terminal based on the target terminal capability information, the source base station receives the handover preparation failure signaling returned by the core network device. The handover preparation failure signaling includes the target base station capability information. The source base station may send the target base station capability information to the multi-card terminal, so that the multi-card terminal may determine the reason why the target base station rejects the cell handover request corresponding to the multi-card terminal. The multi-card terminal may choose to hand over to the cell corresponding to the other base stations by interacting with the source base station, so that the other base stations may more specifically solve the multi-card problem existing in the multi-card terminal.

In the above-mentioned embodiment, the source base station may send the target base station capability information sent by the core network device to the multi-card terminal, thus more specifically solving the multi-card problem existing in the multi-card terminal.

A cell handover solution provided in the present disclosure will be introduced below from a core network device side.

An embodiment of the present disclosure provides a cell handover method. Referring to FIG. 5, FIG. 5 is a flow chart showing a cell handover method according to an embodiment. The method may be performed by a core network device. The core network device includes, but is not limited to, an AMF device. The method may include steps as follows.

In step 501, a handover request signaling and target terminal capability information of a multi-card terminal sent by a source base station corresponding to the multi-card terminal are received.

In an embodiment of the present disclosure, the target terminal capability information is configured to indicate at least one of a multi-card capability supported by the multi-card terminal, or a capability of the multi-card terminal to support reporting a multi-card problem.

In step 502, the handover request signaling and the target terminal capability information are sent to a target base station corresponding to the multi-card terminal.

In an embodiment of the present disclosure, the core network device may send the handover request signaling and the target terminal capability information to the target base station.

In step 503, a handover command is sent to the source base station, in response to receiving a handover request acknowledgement signaling sent by the target base station.

In an embodiment of the present disclosure, in case that the core network device receives the handover request acknowledgement signaling sent by the target base station, it may be determined that the target base station accepts the cell handover request corresponding to the multi-card terminal based on the target terminal capability information. Further, the core network device may send the handover command to the source base station, and after receiving it, the source base station may control the multi-card terminal to perform a cell handover.

In the above-mentioned embodiment, after receiving the handover request signaling and target terminal capability information of the multi-card terminal sent by the source base station, the core network device may send handover request information and the target terminal capability information to the target base station, so that the target base station may determine to accept the cell handover request corresponding to the multi-card terminal based on the target terminal capability information. The purpose of sending the target terminal capability information to the target base station via the core network device, and more specifically solving the multi-card problem existing in the multi-card terminal by the target base station is realized.

In some alternative embodiments, an embodiment of the present disclosure provides a cell handover method. Referring to FIG. 6, FIG. 6 is a flow chart showing a cell handover method according to an embodiment. The method may be performed by a core network device. The core network device includes, but is not limited to, an AMF device. The method may include steps as follows.

In step 601, a handover request signaling and target terminal capability information of a multi-card terminal sent by a source base station corresponding to the multi-card terminal are received.

In an embodiment of the present disclosure, the target terminal capability information is configured to indicate at least one of a multi-card capability supported by the multi-card terminal, or a capability of the multi-card terminal to support reporting a multi-card problem.

In step 602, the handover request signaling added with a second information unit is sent to the target base station corresponding to the multi-card terminal, in which the second information unit is configured to indicate the target terminal capability information.

In an embodiment of the present disclosure, the core network device may add a new information unit into the handover request, that is, add the second information unit. The second information unit is configured to indicate the target terminal capability information.

In step 603, a handover command is sent to the source base station, in response to receiving a handover request acknowledgement signaling sent by the target base station.

In the above-mentioned embodiment, the core network device may add a new second information unit into the handover request signaling, and the second information unit is configured to indicate the target terminal capability information, thus sending the target terminal capability information and the handover request signaling to the target base station together. Therefore, the target base station determines to accept the cell handover request corresponding to the multi-card terminal based on the target terminal capability information, and there is no need to send the target terminal capability information via a separate signaling, thus saving signaling resources.

In a possible example, the core network device receives the target base station capability information sent by the target base station. The core network device may add a new third information unit into the handover command. The third information unit is configured to indicate the target base station capability information, and the target base station capability information is configured to indicate a capability supported by the target base station to solve the multi-card problem existing in the multi-card terminal.

In the above-mentioned embodiment, the core network device may send the target base station capability information to the source base station through the handover command, so that the source base station informs the target base station capability information to the multi-card terminal. Therefore, after the multi-card terminal completes the cell handover, the target base station may better solve an existing multi-card problem for the multi-card terminal according to the target base station capability information.

In some alternative embodiments, referring to FIG. 7, FIG. 7 is a flow chart showing a cell handover method according to an embodiment. The method may be performed by a core network device. The core network device includes, but is not limited to, an AMF device. The method may include steps as follows.

In step 701, a handover request signaling and target terminal capability information of a multi-card terminal sent by a source base station corresponding to the multi-card terminal are received.

In an embodiment of the present disclosure, the target terminal capability information is configured to indicate at least one of a multi-card capability supported by the multi-card terminal, or a capability of the multi-card terminal to support reporting a multi-card problem.

In step 702, the handover request signaling and the target terminal capability information are sent to a target base station corresponding to the multi-card terminal.

In step 703, a handover preparation failure signaling is sent to the source base station, in response to receiving a handover failure signaling sent by the target base station.

In an embodiment of the present disclosure, in case that the core network device receives the handover failure signaling, it may be determined that the target base station rejects the cell handover request corresponding to the multi-card terminal based on the target terminal capability information. The core network device may send the handover preparation failure signaling to the source base station to inform the source base station that the target base station rejects the cell handover request.

In the above-mentioned embodiment, in case that the core network device receives the handover failure signaling sent by the target base station, it is determined that the target base station rejects the cell handover request based on the target terminal capability information. The core network device may inform the source base station via the handover preparation failure signaling. The source base station may subsequently interact with the multi-card terminal to control the multi-card terminal to hand over to a cell corresponding to other base stations, so that the other base stations may more specifically solve the multi-card problem for the multi-card terminal, which is high in availability.

In a possible example, a new fourth information unit is added into the handover preparation failure signaling sent by the core network device to the source base station, and the fourth information unit is configured to indicate target base station capability information. The target base station capability information is configured to indicate a capability supported by the target base station to solve the multi-card problem existing in the multi-card terminal. The source base station may determine a reason why the target base station rejects the cell handover request based on other target base station capability information. The reason includes, but is not limited to, the fact that the target base station does not have the capability to solve the multi-card problem existing in the multi-card terminal, or that although the target base station has the capability to solve the multi-card problem existing in the multi-card terminal, the capability of the target base station to solve the multi-card problem does not match the multi-card problem reported by the multi-card terminal.

In the above-mentioned embodiment, the core network device may send the target base station capability information to the source base station via the handover preparation failure signaling, so that the source base station may determine the reason why the target base station rejects the cell handover request corresponding to the multi-card terminal, which is simple to implement and high in availability.

A cell handover solution provided in the present disclosure will be introduced below from a target base station side.

Figures 8, 9:
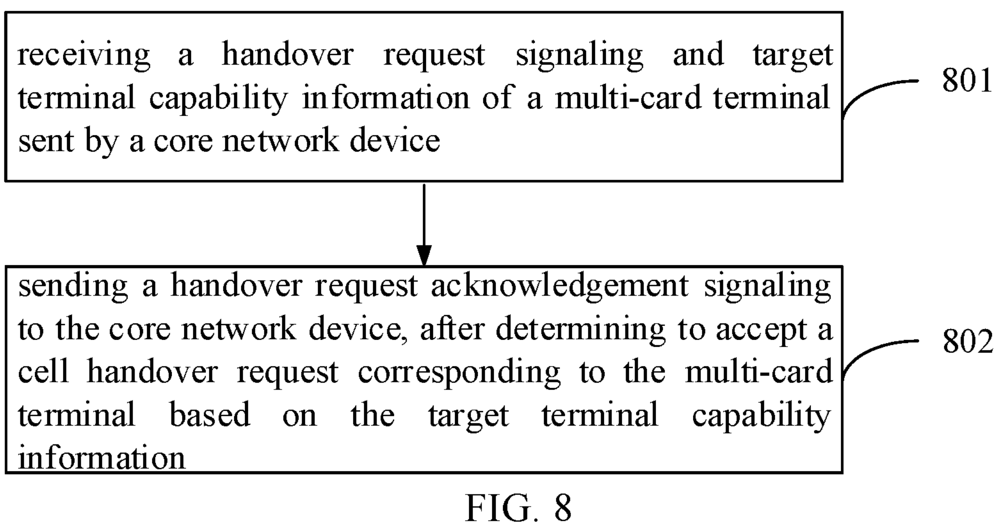
FIG. 8 is a flow chart showing another cell handover method according to an illustrative embodiment.
FIG. 9 is a flow chart showing another cell handover method according to an illustrative embodiment.

Referring to FIG. 8, FIG. 8 is a flow chart showing a cell handover method according to an embodiment. The method may be performed by a target base station. The target base station is a serving base station to which the multi-card terminal is to be handed over. The method may include steps as follows.

In step 801, a handover request signaling and target terminal capability information of a multi-card terminal sent by a core network device are received.

In an embodiment of the present disclosure, the target terminal capability information is configured to indicate at least one of a multi-card capability supported by the multi-card terminal, or a capability of the multi-card terminal to support reporting a multi-card problem.

In step 802, a handover request acknowledgement signaling is sent to the core network device, after determining to accept a cell handover request corresponding to the multi-card terminal based on the target terminal capability information.

In the above-mentioned embodiment, the target base station may determine to accept the cell handover request corresponding to the multi-card terminal in combination with the target terminal capability information of the multi-card terminal, so as to more specifically solve the multi-card problem for the multi-card terminal, which is high in availability.

In a possible implementation, in case that the target terminal capability information is configured to indicate the multi-card capability supported by the multi-card terminal, the target base station may determine to accept the cell handover request based on the target base station having a capability to solve the multi-card problem existing in the multi-card terminal. In case that the target base station does not have the capability to solve the multi-card problem, it may determine to reject the cell handover request.

In another possible implementation, in case that the target terminal capability information is configured to indicate that the capability of the multi-card terminal to support reporting the multi-card problem, the target base station may determine to accept the cell handover request when determining that the target base station has a capability to solve the multi-card problem existing in the multi-card terminal that matches the multi-card problem reported by the multi-card terminal. In case that the target base station has a capability to solve the multi-card problem that does not match the multi-card problem reported by the multi-card terminal, the target base station determines to reject the cell handover request.

In an embodiment of the present disclosure, the target base station having the capability to solve the multi-card problem existing in the multi-card terminal that matches the multi-card problem reported by the multi-card terminal means that the target base station may solve at least one of the multi-card problems reported by the multi-card terminal.

In a possible example, in case that the target base station may solve one of the multi-card problems reported by the multi-card terminal, the target base station determines to accept the cell handover request. In another possible example, only when the target base station may solve all the multi-card problems reported by the multi-card terminal, the target base station accepts the cell handover request corresponding to the multi-card terminal.

In the above-mentioned embodiment, the target base station may determine whether to accept the cell handover request based on the target terminal capability information, so as to more specifically solve the multi-card problem for the multi-card terminal.

In some alternative embodiments, a new fifth information unit is added into the handover request acknowledgement signaling sent by the target base station to the core network device, and the fifth information unit is configured to indicate target base station capability information. The target base station capability information is configured to indicate a capability supported by the target base station to solve the multi-card problem existing in the multi-card terminal.

In the above-mentioned embodiment, the target base station may inform its own capability to support solving the multi-card problem to the core network device via the handover request acknowledgement signaling. The core network device then forwards the target base station capability information to the source base station, so that the source base station may send the target base station capability information to the multi-card terminal, thus more specifically solving the multi-card problem for the multi-card terminal.

In some alternative embodiments, referring to FIG. 9, FIG. 9 is a flow chart showing a cell handover method according to an embodiment. The method may be performed by a target base station. The target base station is a serving base station to which the multi-card terminal is to be handed over. The method may include steps as follows.

In step 901, a handover request signaling and target terminal capability information of a multi-card terminal sent by a core network device are received.

In step 902, a handover failure signaling is sent to the core network device, after determining to reject the cell handover request corresponding to the multi-card terminal based on the target terminal capability information.

In the above-mentioned embodiment, after the target base station acquires the target terminal capability information of the multi-card terminal via the core network device, the handover failure signaling may be sent to the core network device, after determining to reject the cell handover request corresponding to the multi-card terminal based on the target terminal capability information. Therefore, the core network device sends the handover preparation failure signaling to the source base station. The source base station determines that the target base station has rejected the cell handover request. The source base station may control the multi-card terminal to hand over to a cell corresponding to other base stations after interacting with the multi-card terminal, and the other base stations may more specifically solve the multi-card problem for the multi-card terminal.

In some alternative embodiments, a new sixth information unit is added into the handover failure signaling, and the sixth information unit is configured to indicate target base station capability information. The target base station capability information is configured to indicate a capability supported by the target base station to solve the multi-card problem existing in the multi-card terminal.

The target base station may send its own capability to support solving the multi-card problem to the core network device via the handover failure signaling. The core network device may send the target base station capability information to the source base station, and the source base station then sends it to the multi-card terminal, so as to determine the reason why the target base station rejects the cell handover request.

In the above-mentioned embodiment, after rejecting the cell handover request corresponding to the multi-card terminal, the target base station may send the target base station capability information to the core network device, so that the core network device forwards it to the source base station, and the source base station may determine the reason why the target base station rejects the cell handover request based on the target base station capability information, which is simple to implement and high in availability.

Figure 10:
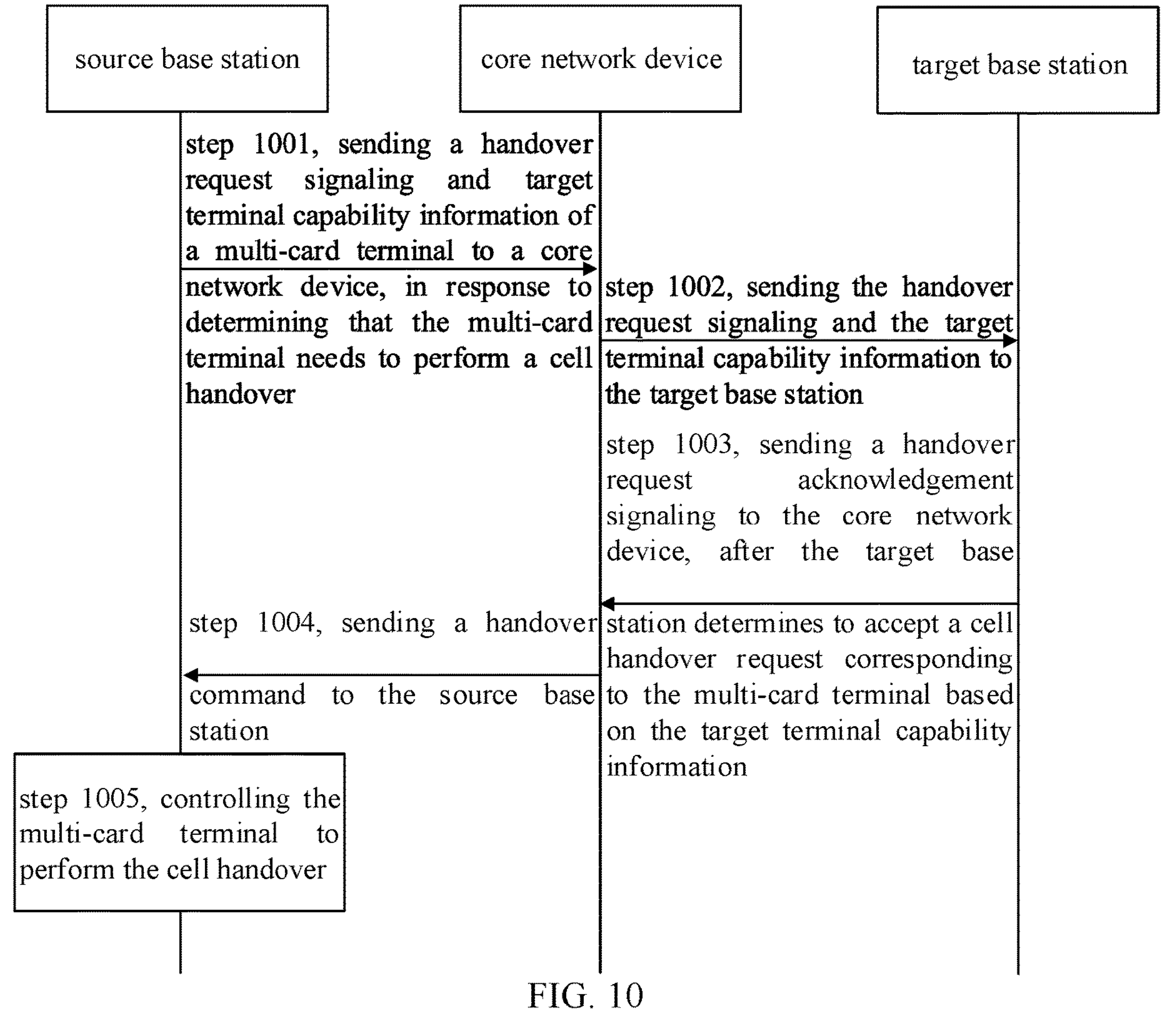
FIG. 10 is a flow chart showing another cell handover method according to an illustrative embodiment.

In some alternative embodiments, referring to FIG. 10, FIG. 10 is a flow chart showing a cell handover method according to an embodiment. The method may include steps as follows.

In step 1001, a source base station sends a handover request signaling and target terminal capability information of a multi-card terminal to a core network device, in response to determining that the multi-card terminal needs to perform a cell handover.

Alternatively, the source base station may send the handover request signaling added with a first information unit to the core network device, in which the first information unit is configured to indicate the target terminal capability information.

In step 1002, the core network device sends the handover request signaling and the target terminal capability information to the target base station.

Alternatively, the core network device sends the handover request signaling added with a second information unit to the target base station, in which the second information unit is configured to indicate the target terminal capability information.

In step 1003, a handover request acknowledgement signaling is sent to the core network device, after the target base station determines to accept a cell handover request corresponding to the multi-card terminal based on the target terminal capability information.

Alternatively, the handover request acknowledgement signaling includes a fifth information unit configured to indicate target base station capability information, and the target base station capability information is configured to indicate a capability supported by the target base station to solve the multi-card problem existing in the multi-card terminal.

In step 1004, the core network device sends a handover command to the source base station.

The handover command includes a third information unit configured to indicate target base station capability information, and the target base station capability information is configured to indicate a capability supported by the target base station to solve the multi-card problem existing in the multi-card terminal. In an embodiment of the present disclosure, the source base station may also send the target base station capability information to the multi-card terminal together via the handover command (not shown in FIG. 10).

In step 1005, the source base station controls the multi-card terminal to perform the cell handover.

In the above-mentioned embodiment, the target base station may determine to accept the cell handover request corresponding to the multi-card terminal based on the target terminal capability information, so as to more specifically solve the multi-card problem for the multi-card terminal, which is high in availability.

Figure 11:
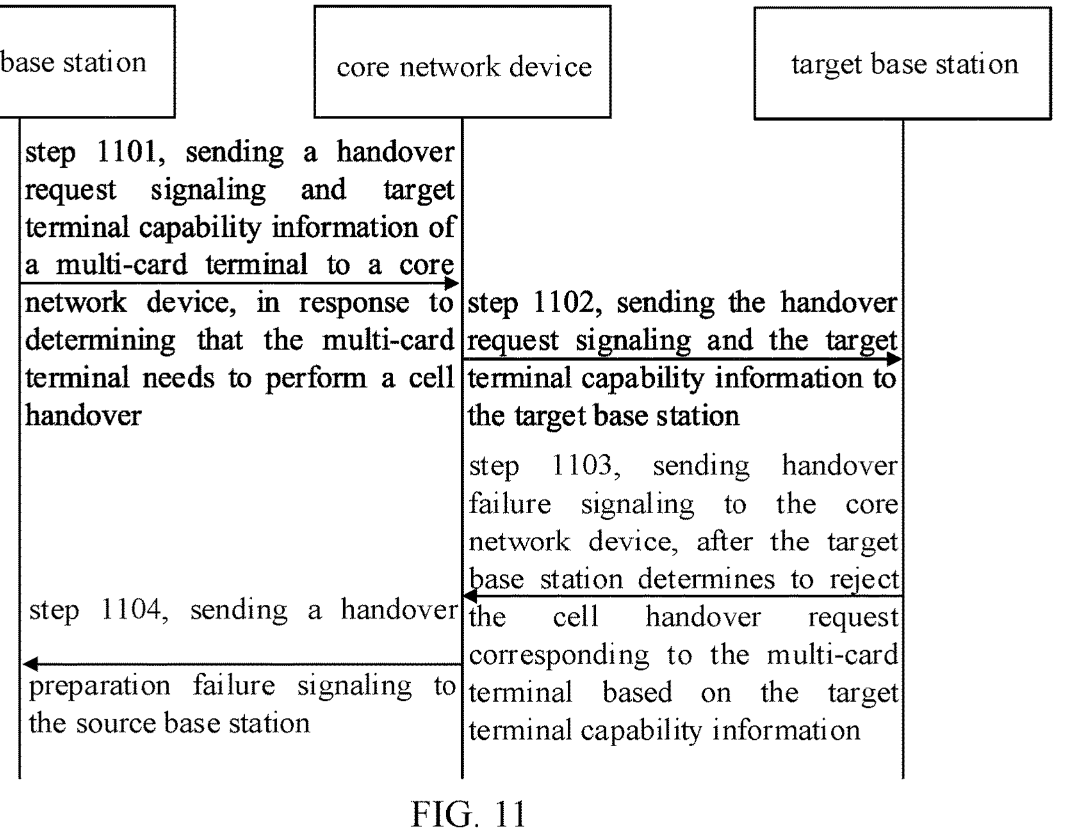
FIG. 11 is a flow chart showing another cell handover method according to an illustrative embodiment.

In some alternative embodiments, referring to FIG. 11, FIG. 11 is a flow chart showing a cell handover method according to an embodiment. The method may include steps as follows.

In step 1101, a source base station sends a handover request signaling and target terminal capability information of a multi-card terminal to a core network device, in response to determining that the multi-card terminal needs to perform a cell handover.

Alternatively, the source base station may send the handover request signaling added with a first information unit to the core network device, in which the first information unit is configured to indicate the target terminal capability information.

In step 1102, the core network device sends the handover request signaling and the target terminal capability information to the target base station.

Alternatively, the core network device sends the handover request signaling added with a second information unit to the target base station, in which the second information unit is configured to indicate the target terminal capability information.

In step 1103, a handover failure signaling is sent to the core network device, after the target base station determines to reject the cell handover request corresponding to the multi-card terminal based on the target terminal capability information.

Alternatively, the handover failure signaling includes a sixth information unit configured to indicate target base station capability information, and the target base station capability information is configured to indicate a capability supported by the target base station to solve the multi-card problem existing in the multi-card terminal.

In step 1104, the core network device sends a handover preparation failure signaling to the source base station.

The handover preparation failure signaling includes a fourth information unit configured to indicate target base station capability information, and the target base station capability information is configured to indicate a capability supported by the target base station to solve the multi-card problem existing in the multi-card terminal. The source base station may also send the target base station capability information to the multi-card terminal together via a handover preparation identification signaling (not shown in FIG. 11).

In the above-mentioned embodiment, the target base station may determine to reject the cell handover request corresponding to the multi-card terminal based on the target terminal capability information, so that a subsequent source base station may control the multi-card terminal to hand over to other base stations that may solve the multi-card problem for the multi-card terminal, thus realizing the purpose of more specifically solving the multi-card problem.

The present disclosure further provides application function implementing apparatus embodiments corresponding to the aforementioned application function implementing method embodiments.

Figure 12:
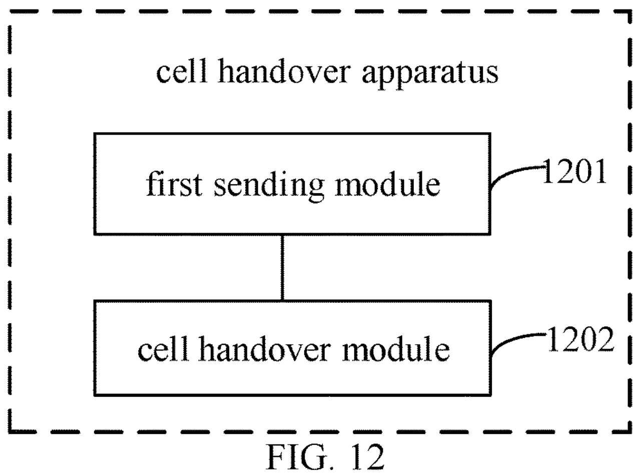
FIG. 12 is a block diagram showing a cell handover apparatus according to an illustrative embodiment.

Referring to FIG. 12, FIG. 12 is a block diagram showing a cell handover apparatus according to an illustrative embodiment. The apparatus is applied to a source base station, and includes a first sending module 1201, and a cell handover module 1202.

The first sending module 1201 is configured to send a handover request signaling and target terminal capability information of a multi-card terminal to a core network device, in response to determining that the multi-card terminal needs to perform a cell handover, in which the target terminal capability information is configured to indicate at least one of a multi-card capability supported by the multi-card terminal, or a capability of the multi-card terminal to support reporting a multi-card problem.

The cell handover module 1202 is configured to control the multi-card terminal to perform the cell handover, after it is determined, based on a handover command returned by the core network device, that a target base station accepts a cell handover request corresponding to the multi-card terminal based on the target terminal capability information.

Figures 13, 14:
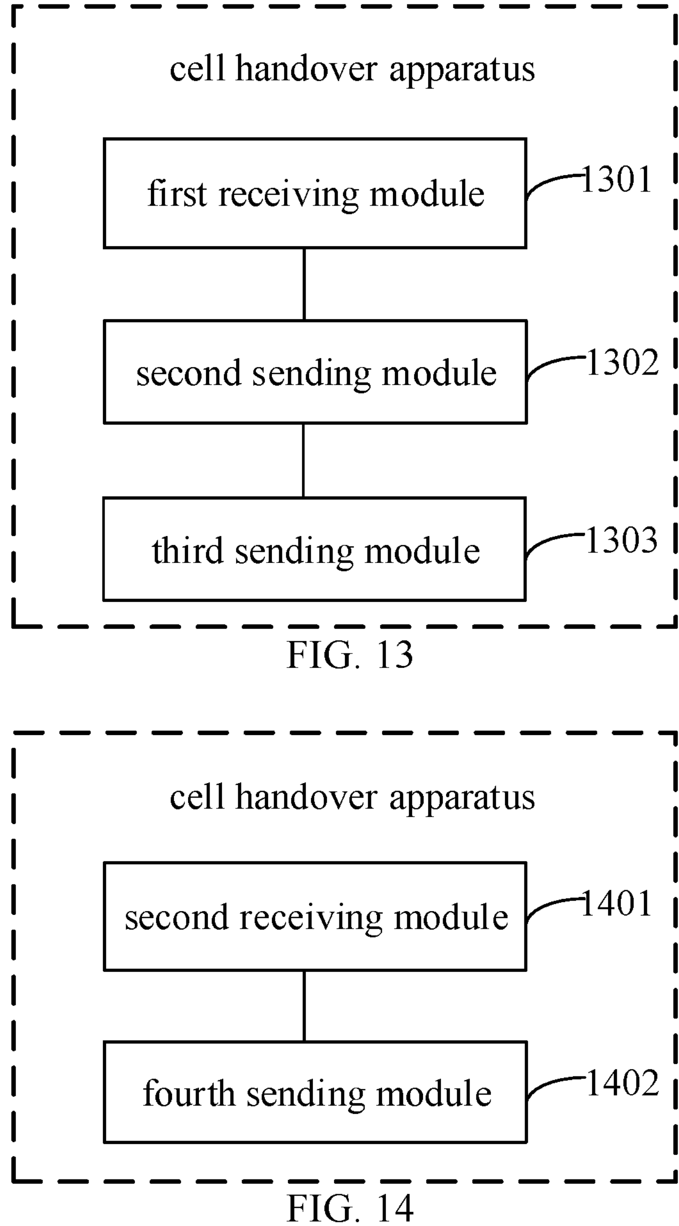
FIG. 13 is a block diagram showing another cell handover apparatus according to an illustrative embodiment.
FIG. 14 is a block diagram showing another cell handover apparatus according to an illustrative embodiment.

Referring to FIG. 13, FIG. 13 is a block diagram showing another cell handover apparatus according to an illustrative embodiment. The apparatus is applied to a core network device, and includes a first receiving module 1301, a second sending module 1302, and a third sending module 1303.

The first receiving module 1301 is configured to receive a handover request signaling and target terminal capability information of a multi-card terminal sent by a source base station corresponding to the multi-card terminal, in which the target terminal capability information is configured to indicate at least one of a multi-card capability supported by the multi-card terminal, or a capability of the multi-card terminal to support reporting a multi-card problem.

The second sending module 1302 is configured to send the handover request signaling and the target terminal capability information to a target base station corresponding to the multi-card terminal.

The third sending module 1303 is configured to send a handover command to the source base station, in response to receiving a handover request acknowledgement signaling sent by the target base station, in which the handover request acknowledgement signaling is configured to indicate that the target base station accepts a cell handover request corresponding to the multi-card terminal based on the target terminal capability information.

Referring to FIG. 14, FIG. 14 is a block diagram showing another cell handover apparatus according to an illustrative embodiment. The apparatus is applied to a target base station, and includes a second receiving module 1401, and a fourth sending module 1402.

The second receiving module 1401 is configured to receive a handover request signaling and target terminal capability information of a multi-card terminal sent by a core network device, in which the target terminal capability information is configured to indicate at least one of: a multi-card capability supported by the multi-card terminal, or a capability of the multi-card terminal to support reporting a multi-card problem.

The fourth sending module 1402 is configured to send a handover request acknowledgement signaling to the core network device, after determining to accept a cell handover request corresponding to the multi-card terminal based on the target terminal capability information.

Since the apparatus embodiments substantially correspond to the method embodiments, reference is made to the partial description of the method embodiments. The above-described apparatus embodiments are merely for the purpose of illustration, in which the units described as separate components may be or may not be physically separated, and the components displayed as units may be or may not be physical units, that is, either located at one place or distributed onto a plurality of network units. The object of embodiments of the present disclosure may be achieved by some or all of the modules in accordance with practical requirements. It would be appreciated and executable by those skilled in the art without creative efforts.

Correspondingly, the present disclosure also provides a computer-readable storage medium. The computer-readable storage medium has stored therein a computer program for executing any of the cell handover methods performed by the above-mentioned base station side.

Correspondingly, the present disclosure also provides a computer-readable storage medium. The computer-readable storage medium has stored therein a computer program for executing any of the cell handover methods performed by the above-mentioned core network device side.

Correspondingly, the present disclosure also provides a cell handover device. The cell handover device includes a processor, and a memory for storing instructions executable by the processor, in which the processor is configured to execute any of the cell handover methods performed by the above-mentioned base station side.

Figure 15:
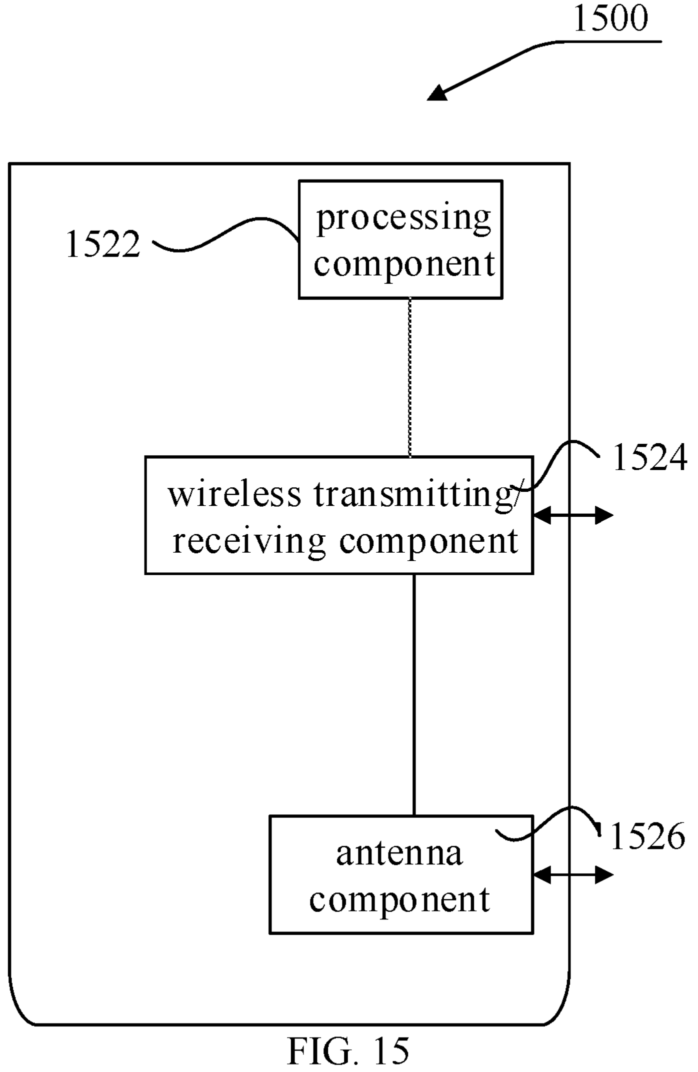
FIG. 15 is a schematic diagram showing a cell handover device according to an illustrative embodiment of the present disclosure.

As shown in FIG. 15, FIG. 15 is a schematic diagram showing a cell handover device 1500 according to an illustrative embodiment. The device 1500 may be provided as a base station. The base station includes, but is not limited to a source base station or a target base station corresponding to a multi-card terminal. Referring to FIG. 15, the device 1500 includes a processing component 1522, a wireless transmitting/receiving component 1524, an antenna component 1526, and a signal processing part unique to a wireless interface, and the processing component 1522 may further include one or more processors.

One of the processing component 1522 may be configured to execute any of the above-mentioned cell handover methods.

Correspondingly, the present disclosure also provides a cell handover device. The cell handover device includes a processor, and a memory for storing instructions executable by the processor, in which the processor is configured to execute any of the cell handover methods performed by the above-mentioned core network device side.

Figure 16:
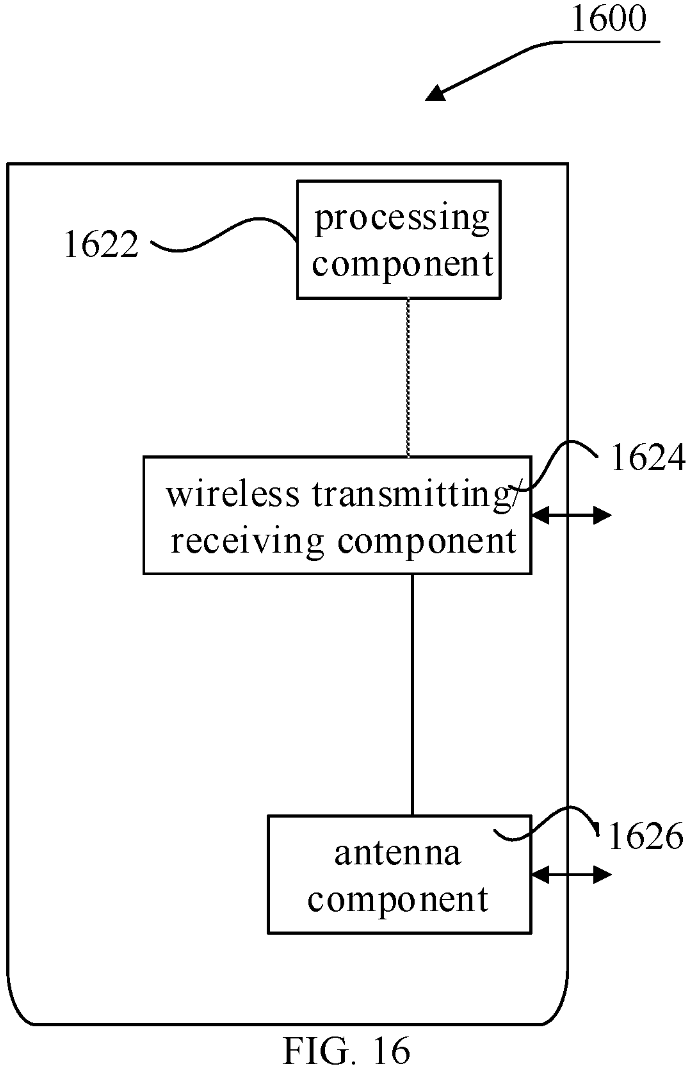
FIG. 16 is a schematic diagram showing another cell handover device according to an illustrative embodiment of the present disclosure.

As shown in FIG. 16, FIG. 16 is a schematic diagram showing a cell handover device 1600 according to an illustrative embodiment. The device 1600 may be provided as a core network device. Referring to FIG. 16, the device 1600 includes a processing component 1622, a wireless transmitting/receiving component 1624, an antenna component 1626, and a signal processing part unique to a wireless interface, and the processing component 1622 may further include one or more processors.

One of the processing component 1622 may be configured to execute any of the above-mentioned cell handover methods.

In order to overcome the problems existing in the related art, embodiment of the present disclosure provides a cell handover method, a cell handover apparatus, and a storage medium.

According to a first aspect of an embodiment of the present disclosure, there is provided a cell handover method. The method is performed by a source base station and includes sending a handover request signaling and target terminal capability information of a multi-card terminal to a core network device, in response to determining that the multi-card terminal needs to perform a cell handover, in which the target terminal capability information is configured to indicate at least one of a multi-card capability supported by the multi-card terminal, or a capability of the multi-card terminal to support reporting a multi-card problem, and controlling the multi-card terminal to perform the cell handover, after it is determined, based on a handover command returned by the core network device, that a target base station accepts a cell handover request corresponding to the multi-card terminal based on the target terminal capability information.

Alternatively, sending the handover request signaling and the target terminal capability information of the multi-card terminal to the core network device includes sending the handover request signaling added with a first information unit to the core network device, in which the first information unit is configured to indicate the target terminal capability information.

Alternatively, the method further includes determining, based on a handover preparation failure signaling returned by the core network device, that the target base station rejects the cell handover request corresponding to the multi-card terminal based on the target terminal capability information.

Alternatively, the method further includes sending the target base station capability information to the multi-card terminal, in response to receiving the target base station capability information sent by the core network device, in which the target base station capability information is configured to indicate a capability supported by the target base station to solve the multi-card problem existing in the multi-card terminal.

According to a second aspect of an embodiment of the present disclosure, there is provided a cell handover method. The method is performed by a core network device and includes receiving a handover request signaling and target terminal capability information of a multi-card terminal sent by a source base station corresponding to the multi-card terminal, in which the target terminal capability information is configured to indicate at least one of a multi-card capability supported by the multi-card terminal, or a capability of the multi-card terminal to support reporting a multi-card problem, sending the handover request signaling and the target terminal capability information to a target base station corresponding to the multi-card terminal, and sending a handover command to the source base station, in response to receiving a handover request acknowledgement signaling sent by the target base station, in which the handover request acknowledgement signaling is configured to indicate that the target base station accepts a cell handover request corresponding to the multi-card terminal based on the target terminal capability information.

Alternatively, sending the handover request signaling and the target terminal capability information to the target base station corresponding to the multi-card terminal includes sending the handover request signaling added with a second information unit to the target base station, in which the second information unit is configured to indicate the target terminal capability information.

Alternatively, the handover command includes a third information unit configured to indicate target base station capability information, and the target base station capability information is configured to indicate a capability supported by the target base station to solve the multi-card problem existing in the multi-card terminal.

Alternatively, the method further includes sending a handover preparation failure signaling to the source base station, in response to receiving a handover failure signaling sent by the target base station, in which the handover failure signaling is configured to indicate that the target base station rejects the cell handover request corresponding to the multi-card terminal based on the target terminal capability information.

Alternatively, the handover preparation failure signaling includes a fourth information unit configured to indicate target base station capability information, and the target base station capability information is configured to indicate a capability supported by the target base station to solve the multi-card problem existing in the multi-card terminal.

According to a third aspect of an embodiment of the present disclosure, there is provided a cell handover method. The method is performed by a target base station and includes receiving a handover request signaling and target terminal capability information of a multi-card terminal sent by a core network device, in which the target terminal capability information is configured to indicate at least one of a multi-card capability supported by the multi-card terminal, or a capability of the multi-card terminal to support reporting a multi-card problem, and sending a handover request acknowledgement signaling to the core network device, after determining to accept a cell handover request corresponding to the multi-card terminal based on the target terminal capability information.

Alternatively, determining to accept the cell handover request corresponding to the multi-card terminal based on the target terminal capability information includes at least one of determining to accept the cell handover request based on the target base station having a capability to solve the multi-card problem existing in the multi-card terminal, in case that the target terminal capability information is configured to indicate the multi-card capability supported by the multi-card terminal, and/or determining to accept the cell handover request, in response to determining that the target base station has a capability to solve the multi-card problem existing in the multi-card terminal that matches the multi-card problem reported by the multi-card terminal, in case that the target terminal capability information is configured to indicate the capability of the multi-card terminal to support reporting the multi-card problem.

Alternatively, the handover request acknowledgement signaling includes a fifth information unit configured to indicate target base station capability information, and the target base station capability information is configured to indicate a capability supported by the target base station to solve the multi-card problem existing in the multi-card terminal.

Alternatively, the method further includes sending a handover failure signaling to the core network device, after determining to reject the cell handover request corresponding to the multi-card terminal based on the target terminal capability information.

Alternatively, the handover failure signaling includes a sixth information unit configured to indicate target base station capability information, and the target base station capability information is configured to indicate a capability supported by the target base station to solve the multi-card problem existing in the multi-card terminal.

According to a fourth aspect of an embodiment of the present disclosure, there is provided a cell handover apparatus. The apparatus is applied to a source base station and include a first sending module configured to send a handover request signaling and target terminal capability information of a multi-card terminal to a core network device, in response to determining that the multi-card terminal needs to perform a cell handover, in which the target terminal capability information is configured to indicate at least one of a multi-card capability supported by the multi-card terminal, or a capability of the multi-card terminal to support reporting a multi-card problem, and a cell handover module configured to control the multi-card terminal to perform the cell handover, after it is determined, based on a handover command returned by the core network device, that a target base station accepts a cell handover request corresponding to the multi-card terminal based on the target terminal capability information.

According to a fifth aspect of an embodiment of the present disclosure, there is provided a cell handover apparatus. The apparatus is applied to a core network device and include a first receiving module configured to receive a handover request signaling and target terminal capability information of a multi-card terminal sent by a source base station corresponding to the multi-card terminal, in which the target terminal capability information is configured to indicate at least one of a multi-card capability supported by the multi-card terminal, or a capability of the multi-card terminal to support reporting a multi-card problem, a second sending module configured to send the handover request signaling and the target terminal capability information to a target base station corresponding to the multi-card terminal, and a third sending module configured to send a handover command to the source base station, in response to receiving a handover request acknowledgement signaling sent by the target base station, in which the handover request acknowledgement signaling is configured to indicate that the target base station accepts a cell handover request corresponding to the multi-card terminal based on the target terminal capability information.

According to a sixth aspect of an embodiment of the present disclosure, there is provided a cell handover apparatus. The apparatus is applied to a target base station and include a second receiving module configured to receive a handover request signaling and target terminal capability information of a multi-card terminal sent by a core network device, in which the target terminal capability information is configured to indicate at least one of a multi-card capability supported by the multi-card terminal, or a capability of the multi-card terminal to support reporting a multi-card problem, and a fourth sending module configured to send a handover request acknowledgement signaling to the core network device, after determining to accept a cell handover request corresponding to the multi-card terminal based on the target terminal capability information.

According to a seventh aspect of an embodiment of the present disclosure, there is provided a computer-readable storage medium. The computer-readable storage medium has stored therein computer programs for executing the cell handover method described in any one of the above-mentioned first aspect, or the above-mentioned third aspect.

According to an eighth aspect of an embodiment of the present disclosure, there is provided a computer-readable storage medium. The computer-readable storage medium has stored therein computer programs for executing the cell handover method described in any one of the above-mentioned second aspect.

According to a ninth aspect of an embodiment of the present disclosure, there is provided a cell handover device. The cell handover device includes a processor, and a memory for storing instructions executable by the processor, in which the processor is configured to execute the cell handover method described in any one of the above-mentioned first aspect, or the above-mentioned third aspect.

According to a tenth aspect of an embodiment of the present disclosure, there is provided a cell handover device. The cell handover device includes a processor, and a memory for storing instructions executable by the processor, in which the processor is configured to execute the cell handover method described in any one of the above-mentioned second aspect.

The technical solution provided in the embodiments of the present disclosure may include the following beneficial effects.

In the present disclosure, the target base station to be handed over by the multi-card terminal may acquire the target terminal capability information of the multi-card terminal via the core network device, in which the target terminal capability information is configured to indicate at least one of the multi-card capability supported by the multi-card terminal, or the capability of the multi-card terminal to support reporting the multi-card problem, and the target base station may determine to accept the cell handover request corresponding to the multi-card terminal based on the target terminal capability information, so as to more specifically solve the multi-card problem for the multi-card terminal, which is high in availability.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

What is claimed is:

1. A cell handover method, performed by a source base station, comprising:

determining that a multi-card terminal needs to perform a cell handover;

sending a handover request signaling and target terminal capability information of the multi-card terminal to a core network device, wherein the target terminal capability information is configured to indicate at least one of following capabilities: a multi-card capability supported by the multi-card terminal, or a capability of the multi-card terminal to support reporting a multi-card problem;

determining, based on a handover command returned by the core network device, that a target base station accepts a cell handover request corresponding to the multi-card terminal based on the target terminal capability information;

controlling the multi-card terminal to perform the cell handover;

receiving target base station capability information sent by the core network device; and sending the target base station capability information to the multi-card terminal, wherein the target base station capability information is configured to indicate a capability supported by the target base station to solve the multi-card problem existing in the multi-card terminal.

2. The method of claim 1, wherein sending the handover request signaling and the target terminal capability information of the multi-card terminal to the core network device comprises:

sending the handover request signaling added with a first information unit to the core network device, wherein the first information unit is configured to indicate the target terminal capability information.

3. The method of claim 1, further comprising:

determining, based on a handover preparation failure signaling returned by the core network device, that the target base station rejects the cell handover request corresponding to the multi-card terminal based on the target terminal capability information.

4. A cell handover method, performed by a core network device, comprising:

receiving a handover request signaling and target terminal capability information of a multi-card terminal sent by a source base station corresponding to the multi-card terminal, wherein the target terminal capability information is configured to indicate at least one of following capabilities: a multi-card capability supported by the multi-card terminal, or a capability of the multi-card terminal to support reporting a multi-card problem;

sending the handover request signaling and the target terminal capability information to a target base station corresponding to the multi-card terminal; and receiving a handover request acknowledgement signaling sent by the target base station; and sending a handover command to the source base station, wherein the handover request acknowledgement signaling is configured to indicate that the target base station accepts a cell handover request corresponding to the multi-card terminal based on the target terminal capability information;

wherein the handover command comprises a third information unit configured to indicate target base station capability information, and the target base station capability information is configured to indicate a capability supported by the target base station to solve the multi-card problem existing in the multi-card terminal.

5. The method of claim 4, wherein sending the handover request signaling and the target terminal capability information to the target base station corresponding to the multi-card terminal comprises:

sending the handover request signaling added with a second information unit to the target base station, wherein the second information unit is configured to indicate the target terminal capability information.

6. The method of claim 4, further comprising:

receiving a handover failure signaling sent by the target base station; and sending a handover preparation failure signaling to the source base station, wherein the handover failure signaling is configured to indicate that the target base station rejects the cell handover request corresponding to the multi-card terminal based on the target terminal capability information.

7. The method of claim 6, wherein the handover preparation failure signaling comprises a fourth information unit configured to indicate the target base station capability information.

8. A cell handover method, performed by a target base station, comprising:

receiving a handover request signaling and target terminal capability information of a multi-card terminal sent by a core network device, wherein the target terminal capability information is configured to indicate at least one of following capabilities: a multi-card capability supported by the multi-card terminal, or a capability of the multi-card terminal to support reporting a multi-card problem;

determining to accept a cell handover request corresponding to the multi-card terminal based on the target terminal capability information; and sending a handover request acknowledgement signaling to the core network device;

wherein the handover request acknowledgement signaling comprises a fifth information unit configured to indicate target base station capability information, and the target base station capability information is configured to indicate a capability supported by the target base station to solve the multi-card problem existing in the multi-card terminal.

9. The method of claim 8, wherein determining to accept the cell handover request corresponding to the multi-card terminal based on the target terminal capability information comprises at least one of following steps:

determining to accept the cell handover request based on the target base station having a capability to solve the multi-card problem existing in the multi-card terminal, wherein the target terminal capability information is configured to indicate the multi-card capability supported by the multi-card terminal; or determining that the target base station has a capability to solve the multi-card problem existing in the multi-card terminal that matches the multi-card problem reported by the multi-card terminal, and determining to accept the cell handover request, wherein the target terminal capability information is configured to indicate the capability of the multi-card terminal to support reporting the multi-card problem.

10. The method of claim 8, further comprising:

determining to reject the cell handover request corresponding to the multi-card terminal based on the target terminal capability information; and sending a handover failure signaling to the core network device.

11. The method of claim 10, wherein the handover failure signaling comprises a sixth information unit configured to indicate the target base station capability information.

12. A cell handover device, comprising:

a processor; and a memory for storing instructions executable by the processor;

wherein the processor is configured to execute the cell handover method of claim 1.

13. A cell handover device, comprising:

a processor; and a memory for storing instructions executable by the processor;

wherein the processor is configured to execute the cell handover method of claim 4.

14. A cell handover device, comprising:

a processor; and a memory for storing instructions executable by the processor;

wherein the processor is configured to execute the cell handover method of claim 8.

* * * * *